(12) United States Patent
Petrovykh et al.

(10) Patent No.: US 9,444,936 B2
(45) Date of Patent: Sep. 13, 2016

(54) INTERACTION REQUEST PROCESSING ACCORDING TO CLIENT PRE-CONFIGURED SCHEDULE

(71) Applicant: GENESYS TELECOMMUNICATIONS LABORATORIES, INC., Daly City, CA (US)

(72) Inventors: Yevgeniy Petrovykh, Walnut Creek, CA (US); Herbert Willi Artur Ristock, Walnut Creek, CA (US); Vidas Placiakis, Walnut Creek, CA (US); Alex Petrov, San Bruno, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 13/969,442

(22) Filed: Aug. 16, 2013

(65) Prior Publication Data
US 2015/0049869 A1 Feb. 19, 2015

(51) Int. Cl.
*H04M 3/51* (2006.01)
*H04M 3/523* (2006.01)

(52) U.S. Cl.
CPC ......... *H04M 3/5158* (2013.01); *H04M 3/5191* (2013.01); *H04M 3/5231* (2013.01); *H04M 2203/2072* (2013.01); *H04M 2242/28* (2013.01)

(58) Field of Classification Search
CPC .......... H04M 3/5191; H04M 3/5231; H04M 3/5158; H04M 2203/2072; H04M 2242/28
USPC ........................... 379/210.01, 265.01–266.08
See application file for complete search history.

(56) References Cited

U.S. PATENT DOCUMENTS

| | | | | |
|---|---|---|---|---|
| 5,155,761 A | * | 10/1992 | Hammond | 379/88.2 |
| 7,787,609 B1 | * | 8/2010 | Flockhart et al. | 379/265.01 |
| 2006/0002538 A1 | * | 1/2006 | Dezonno | H04M 3/5158 379/210.01 |
| 2006/0167729 A1 | * | 7/2006 | Rafter et al. | 705/8 |

* cited by examiner

Primary Examiner — Harry S Hong
(74) Attorney, Agent, or Firm — Lewis Roca Rothgerber Christie LLP (57) ABSTRACT

An apparatus is provided and includes a processor and a memory, the memory storing instructions that when executed from a non-transitory physical medium by the processor cause the processor to detect when a request for interaction that is configured for a scheduled processing is received or otherwise registered at a service access point associated with a contact center, identify schedule data from the request and add the schedule data along with a request identification and a location identifier to a scheduling and reporting application, consult a contact center interaction routing system in response to determining that the scheduled interaction request is to be processed, and route or cause processing of the interaction request based on the schedule data. According to one embodiment, the schedule data includes a scheduled time and date for processing the request.

22 Claims, 5 Drawing Sheets

Fig. 5

INTERACTION REQUEST PROCESSING ACCORDING TO CLIENT PRE-CONFIGURED SCHEDULE

BACKGROUND

1. Field

The present invention is in the field of contact center service and pertains particularly to methods and apparatus for processing deferrable interaction requests in a contact center according to customer schedule.

2. Discussion of the State of the Art

In the field of contact center service, contact centers exist for the purpose of customer fulfillment relative to sales and service. State of art contact centers are capable of managing communications over several different channels including voice, messaging, and other Web-based communication such as chat, form submission, Web invitation, and link redirection.

Customers and visitors may initiate contact with a contact center in a variety of ways. The contact center may be reached by email, chat request, text messaging, telephone, cellular telephone, voice over Internet protocol (VoIP), Web form submission, hypertext transfer protocol (HTTP) link redirect, and URL activation.

One challenge for contact centers is to be in a position to assist customers at a time that is most convenient for the customer. Successful handling of incoming traffic over any channel depends upon a variety of conditions. Most notable, for requests where live interaction with an agent or automated process is desired, the customer waits for the agent or process to become available. The customer may have scheduled duties and other responsibilities and may not be amenable to a long wait in queue. Many call centers have a "call me back" feature wherein a customer may be prompted to accept a call back from the center after making intent known that the customer desires interaction with the center. The call beck feature or option may be utilized in messaging, Web interaction, form submission, voice call, and VoIP.

Use of a call back feature by customers may rise dramatically if the center is experiencing peak traffic and resources are currently not available to handle requests for interaction. The call back feature is relatively generic in that it does not directly promise or guarantee that a call back response associated with a request is forthcoming. Moreover, the call back windows (time range for return call) are dictated by the contact center and the customer may not be quite sure that the request will be responded, let alone, when the response is likely to occur.

Therefore, what is clearly needed is a method and apparatus for defining the start time of processing interaction requests according to customer preferences.

SUMMARY

In one implementation of the present invention an apparatus is provided and includes a processor and a memory, the memory storing instructions that when executed from a non-transitory physical medium cause the processor to detect when a request for interaction that is configured for a scheduled processing is received or otherwise registered at a service access point associated with a contact center, identify schedule data from the request and add the schedule data along with a request identification and a location identifier to a scheduling and reporting application, consult a contact center interaction routing system in response to determining that the scheduled interaction request is to be processed, and route or cause processing of the interaction request based on the schedule data. According to one embodiment, the schedule data includes a scheduled time and date for processing the request.

In one implementation, the request for interaction is a voice request in the form of plain old telephony service (POTS) or a voice over Internet protocol (VoIP). In one implementation, the request for interaction is an email, a short message service (SMS), or a multimedia message service (MMS) request. In another implementation, the request for interaction is a video mail, a video call, or a hypertext transfer protocol (HTTP) request.

In one implementation, the communications appliance is a telephone, a cellular phone, an android device, an electronic reader, or a tethered or un-tethered computer. In one implementation of the present invention, the service access point is a telephone switch, a call distributor, or a network-connected server. In one implementation, the scheduling and reporting application is a work force management application having access to workforce availability and schedule data. In one implementation, the routing system is one of a message routing system, a voice call routing system, or an integrated system adapted to route text, voice, and multimedia requests for interaction. In one implementation, the schedule data includes a plurality of times to process the request or a plurality of media types for transmitting a response, wherein a particular media type is selected from the plurality of media types based on a particular one of the plurality of times selected to process the request.

According to another implementation of the invention, an apparatus is provided and includes a processor and a memory, the memory storing instructions that when executed by the processor cause the processor to distribute to or serve to a communications appliance, an executable interface for associating a schedule for processing to a request for interaction, detect when a request for interaction is initiated on a communications appliance, and execute or otherwise present the interface to facilitate configuration of the schedule for processing relative to the request for interaction. In one implementation, the request for interaction is a voice request in the form of plain old telephony service (POTS) or a voice over Internet protocol (VoIP). In one implementation, the request for interaction is an email, a short message service (SMS), or a multimedia message service (MMS) request. In one implementation, the request for interaction is a video mail, a video call, or a hypertext transfer protocol (HTTP) request. In one implementation, the communications appliance is a telephone, a cellular phone, an android device, an electronic reader, or a tethered or un-tethered computer. In one implementation, the schedule data relative to the request for interaction includes more than one time to process the request and or process the request and or more than one media designation for a response depending upon the time processing occurs.

According to one aspect of the present invention, a method is provided including acts detecting when a request for interaction that is configured for a scheduled processing is received or otherwise registered at a service access point of a contact center, collecting schedule data from the request and adding the schedule data along with request identification and location in the system to a scheduling and reporting application, consulting a contact center interaction routing system when the need to process a scheduled interaction request arises, and routing or otherwise causing processing of the interaction request at or just prior to the scheduled processing time and date. In one aspect of the method, the service access point is a telephone switch, a call distributor, or a network-connected server. In one aspect, the scheduling and reporting application is a work force management application having access to workforce availability and schedule data. In one aspect of the method, the routing system is one of a message routing system, a voice call routing system, or an integrated system adapted to route text, voice, and multimedia requests for interaction. In one aspect, the schedule data relative to the request for interaction includes more than one time to process to the request and or more than one media designation for a response depending upon the time processing occurs.

DETAILED DESCRIPTION

In general terms, embodiments of the present invention are directed to a system and method for facilitating contact center interaction request processing according to a customer-configured schedule for processing. Embodiments of the present invention are described in enabling detail using the following implementations, which may describe more than one relevant implementation falling within the scope of the present invention.

Figure 1:
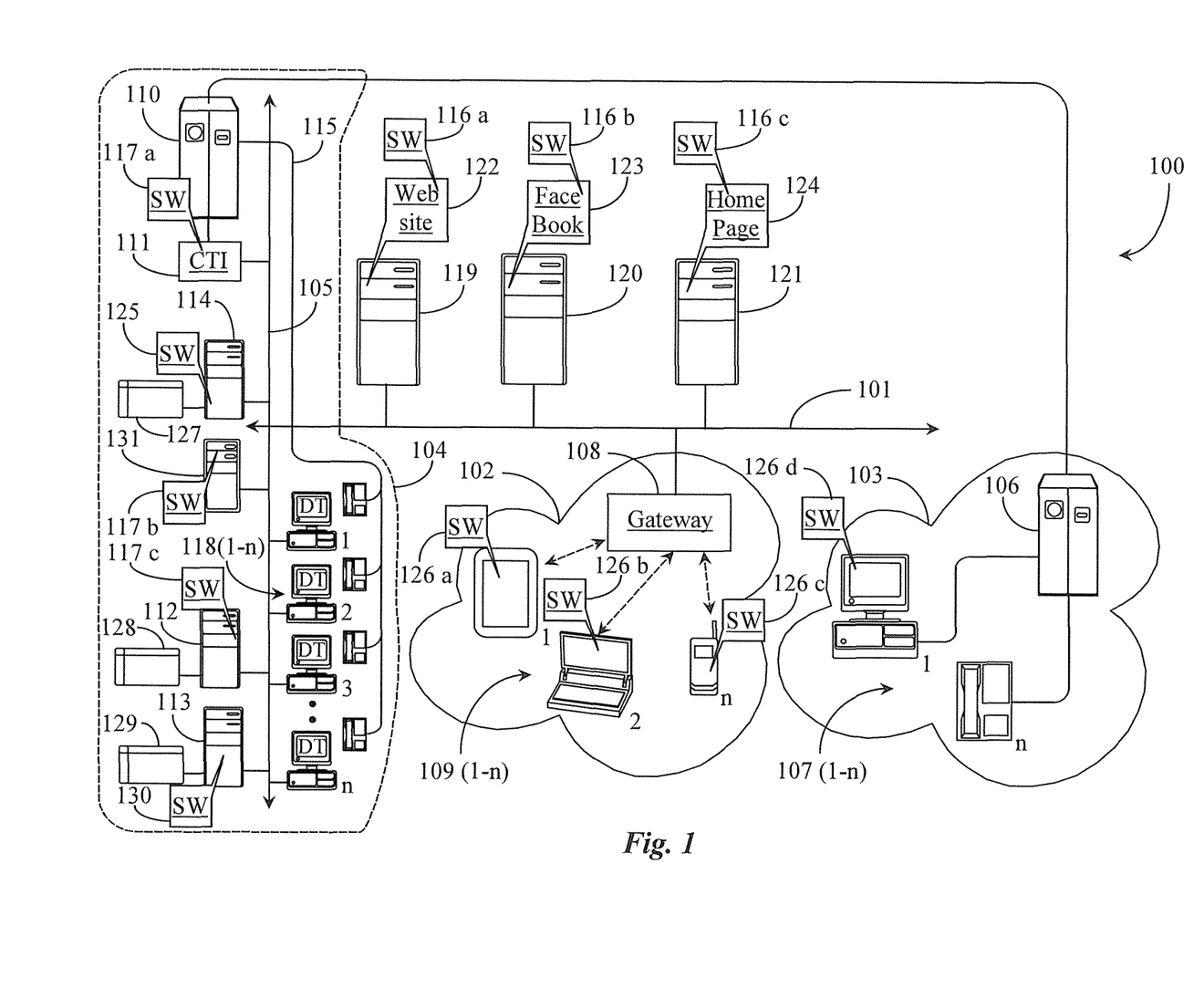
FIG. 1 is an architectural diagram of a communications network supporting customer-driven scheduling of interaction processing according to an implementation of the present invention.

FIG. 1 is an architectural diagram of a communications network 100 supporting customer-driven scheduling of interaction processing according to an implementation of the present invention. Communications network 100 may include the well-known Internet network represented herein by an Internet backbone 101. Internet Backbone 101 may represent all of the lines, equipment, and access points that make up the Internet network as a whole, including any connected sub-networks. Therefore there are no geographic limitations to the practice of the present invention. Network 101 may be a corporate wide area network (WAN), or a municipal area network (MAN) without departing from the spirit and scope of the present invention. According to one implementation, the Internet network is chosen because of its high public access characteristic. Internet backbone 101 may also be referred to as Internet 101 in this specification.

A wireless communications carrier network 102 is depicted in this architectural implementation and may have connection to Internet 101 through a multimedia gateway 108. Wireless network 102 may be a cellular telephony network such as a code division multiple access (CDMA), a time division multiple access (TDMA), or a global system for mobile communications (GSM) network without departing from the spirit and scope of the invention. Network 102 may also be a wireless fidelity (WiFi) or another wireless communications access network without departing from the spirit and scope of the invention.

A publicly switched telephone network (PSTN) 103 is depicted in this architectural implementation and may have a telephony network connection to a contact center represented herein as a contact center 104 enclosed by a broken boundary. PSTN 103 may also have connection to Internet 101 (not illustrated) through an Internet service provider company and a telephony-to-Internet protocol gateway. Methods of Internet access from PSTN network 103 may include dialup/modem, digital subscriber line (DSL), integrated services digital network (ISDN), cable/modem, or the like. Customers of contact center 104 are represented herein as communications appliance 107 (1-$n$) in PSTN 103 and communications appliances 109 (1-$n$) in wireless carrier network 102.

Appliances 109 (1-$n$) may include a smart phone or iPad computing appliance 109 (1), a laptop computing appliance 109 (2), and a cellular telephone 109 ($n$), or any other appliance enabled for Internet access. In one implementation wireless carrier network 102 and PSTN network 103 are bridged (not illustrated) for seamless communication between networks and the Internet. Seamless communication between the Internet, a wireless sub-network, and the PSTN network is well established and well understood in the art. Such bridging components include gateways, switches, edge routers, and the like and may not be specifically depicted in this architectural representation but may be assumed present where applicable according to known art.

Contact center 104 may be a single contact center or a federation of multiple contact centers without departing from the spirit and scope of the present invention. A single contact center is represented in this implementation and is deemed sufficient for description of the present invention. Contact center 104 is further represented by a local area network (LAN) 105. LAN 105 may support contact center equipment and network-based communications equipment. Contact center 104 may include a central office telephone switch 110 that may represent the last stop for incoming calls destined for agents and or services within the center. Switch 110 may be an automated call distributor (ACD), a private branch exchange (PBX) switch, or some other type of telephone switch without departing from the spirit and scope of the present invention. In one implementation switch 110 may be a "soft" switch implemented in software without departing from the spirit and scope of the present invention.

Telephone switch 110 is accessible from PSTN network 103 via telephone trunk from a PSTN telephone switch 106. Switch 106 may be comparable in description to switch 110 in contact center 104. Switch 110 in contact center 104 may be enhanced for routing and switching intelligence via a processor 111. Processor 111 may have connection to switch 110 via a link. LAN 105 may support processor 111 in this implementation. Other telephony service features that may be provided at switch 110 may include interactive media response (IMR) services, agent level routing (ALR) services, conferencing services, and so on. It is noted herein that IMR services cover a variety of media channels including voice and may replace traditional interactive voice response (IVR) services where applicable. IVR services may be considered a sub-category of IMR for the purposes of discussion.

Telephone switch 110 may connect to a plurality of telephones distributed throughout contact center 104 which may be connected to the switch by internal telephony wiring 115. In this architectural implementation telephones may also be LAN-connected telephones capable of IP telephony calls. LAN 105 in contact center 104 supports multiple agent workstations 118 (1-*n*). Agent workstations 118 (1-*n*) may include a LAN-connected computing appliance such as a desktop computer or terminal and an aforementioned telephone (PSTN or LAN-connected or both). In this implementation the agent computing appliances are desktop computers having display and communications capabilities. Each station may be supported by transaction and servicing software in the form of an agent desktop (DT) application that enables the agent to log into the contact center system and perform all related communications and transaction services.

LAN 105 may be connected to Internet network 101 on a continuous persistent basis or during scheduled work periods. Contact center 104 may maintain or make use of a Website 122 depicted herein as executing from a Web server 119 hosted on Internet 101. Website 122 may include customer access points such as embedded contact options for visiting customers like "call now" and "call me back". There may be login interface for returning customers. Multimedia interfaces facilitating chat, email, video, messaging, and the like may also be provided for facilitating customer access and interaction with call center services including redirection to other service Websites or pages within the same website. Web server 119 may include a processor, a data repository, and a non-transitory medium storing instructions and components for enabling functionality as a Web server. A third-party web hosting service may host web server 119 or it may be maintained by the contact center without departing from the spirit and scope of the present invention.

LAN 105 within contact center 104 may support various contact center components including but not limited to a universal routing server 112 and an authentication server 113. Other supported components may include an application server, a directory server, a statistics server, and a customer information system among others. The inventor depicts a routing server and an authentication server as basic components that may be utilized during the practice of the present invention.

Routing server 112 may include a processor, a data repository, and a non-transitory medium containing all of the instruction for enabling function as a routing server. Routing server 112 is intended to broadly represent routing capability that may include routing of voice calls, video calls, email, chat requests, and other types of interaction requests. In one implementation an interaction request may be of the form of activating a Web link or universal resource locator (URL). It may be appreciated that there may also be separate dedicated routing systems for different media types or channels without departing from the spirit and scope of the present invention. Routing server 112 includes a data repository 128 adapted to contain routing strategies and other data relative to interaction routing.

Authentication server 113 may include a processor, a data repository, and a non-transitory medium storing instructions necessary to enable function as an authentication server. Authentication server 113 is intended to broadly represent authentication services available to contact center 104. Authentication services may utilize the well-known OAuth protocol. Authentication server 113 is depicted connected to LAN 105 in this implementation within the domain of contact center 104. However in one implementation server 113 is a public server hosted on Internet 101.

In one implementation server 113 is responsible for authenticating resource owners and parties given permission to access otherwise protected resources. Resources may include files, data, and live or pending interaction requests. It will be appreciated by one with skill in the art that certain resources owned by customers of contact center 104 might be stored on different systems dependant upon the types or classes of resources without departing from the spirit and scope of the present invention. For example customer-shipping history may be stored separately from pending customer requests or orders for services. Resources may include interaction requests that may be encrypted when received and decrypted using a decryption key available from server 113 upon presentation of a valid token.

Internet 101 may support a Web server 120 adapted to host one or more social interaction services and a Web server 121. Web server 120 may be hosted within the physical domain of contact center 104 and may be supported by LAN 105 without departing from the spirit and scope of the present invention. In this implementation Web server 120 is hosted on the Internet. Web server 120 may be assumed to include a processor, a data repository, and a non-transitory medium (e.g. memory) storing all of the instructions required for enabling the functionality of a Web server. Web server 120 in one implementation is intended to broadly represent any Web server adapted to host a social interaction service and to serve social interaction service home pages or social profile pages to subscribers of such services.

Web server 121 may be hosted within the physical domain of contact center 104 and may be supported by LAN 105. In this implementation Web server 121 is hosted on the Internet but may still be maintained and controlled by contact center 104. In one implementation Web server 121 is hosted by a third party and provides Web hosting services. Web server 121 may be assumed to include a processor, a data repository, and a non-transitory medium (e.g. memory) containing all instruction required for enabling the functionality of a Web server. Web server 121 is intended to broadly represent Web site hosting services for any consumer seeking to establish a Website with a home page such as home page 124 depicted in this implementation. Web server 120 hosts a Facebook™ Webpage 123 representing a profile page set up by a customer whom is subscribed to the service. Other social interaction services such as My Space™ for example might be represented herein without departing from the spirit and scope of the invention. Facebook™ is just one of many possible social interaction services that might be hosted on server 120.

LAN 105 within contact center 104 may support an Internet protocol router (IPR) 131. IPR 131 may initially receive and route Internet traffic onto and off of LAN 105. IPR 131 may be assumed to include a processor, a data repository, and a non-transitory medium (e.g. memory) storing instructions necessary to enable function as a router for routing Internet traffic onto LAN 105. LAN 105 may also support a workforce management server (WFM) 114. WFM server 114 may be assumed to include a processor, a data repository, and a non-transitory medium (e.g. memory) storing instructions necessary to enable function as a workforce management server charged with managing the tasks, duties, and schedules of the workforce in contact center 104. In typical implementation agents working at stations 118 (1-*n*) log into WFM 114 at the beginning of a shift and log out of the server when the shift is over.

In one implementation the system may utilize an authorization procedure to allow third and first party access to resources considered owned by a customer including pending interaction requests of deferrable multimedia types that might be waiting in the system for contact center processing.

In one implementation a customer such as a customer operating any of appliances 109 (1-n) or 107 (1-n) may access Website 122 and register with the aid of SW 116 *a* for interaction processing control by specific customer-derived schedule as a service and may install a set of SW instructions from a non-transitory medium onto the sending appliance the executing instructions enabling the customer to configure a schedule that may dictate processing for any interaction request sent from the appliance.

It is noted herein that processing the request may include a wide variety of tasks including responding (response) back to the requester. According to one implementation, an interaction request containing a schedule for initiating processing is formerly scheduled in the center for processing after it is received and the scheduling data is accessed. The interaction request might remain in an encrypted state (except for schedule data) before or until scheduled processing occurs. The customer schedule defines the exact point in time where it is acceptable to the customer for the processing to begin.

In one implementation registration for customer scheduled interaction processing may be offered to potential customers through other potential access points such as a Facebook™ profile page 123 with the aid of SW 166 *b* or from any other customer controlled home page such as home page 124 with the aid of SW 116 *c*. SW 116 may provide a downloadable application program interface (API) or browser extension (Plug-in) that includes access to a server-hosted interface that may be used by the customer to attach a specific interaction-processing schedule to any interaction request sent to a participating entity such as contact center 104 represented in this example.

In one implementation, SW 116 (*a-c*) provides a stand-alone interface that downloads to and installs on the sending appliance used by the customer to create and send requests for interaction. In this implementation, the customer may configure one or more pending interaction requests for scheduled processing offline and may send such requests whenever the appliance has active connection to network 101. In this implementation, SW 126 (*a-d*) depicted as installed on customer appliances 109 (1-n) and on appliance 107 (1) represents a downloaded extension, API, or stand-alone user interface (UI). Various levels of server assistance might be provided with any downloaded instructions without departing from the spirit and scope of the present invention. SW instances 126 (*a-d*) may vary slightly because they may be tailored to the type of communications appliance and the operating platform they are downloaded to and installed on without departing from the spirit and scope of the present invention.

In one implementation a customer such as one operating communications appliance 107 (*n*), a standard plain old telephony service (POTS) telephone, may not have an available interface or program for attaching a processing schedule to an interaction request sent from the telephone. In this implementation an IMR system may intercept the call at switch 110 within contact center 104 and may provide the capability for the customer to schedule processing with the aid of processor 111 running an instance of SW 117 *a*. SW 117 *a* may be served by an application server (not illustrated), or it may be native to the processor. SW 117 *a* may provide an IMR version of SW interface capability described further above with reference to SW 116 (*a-c*). It is noted herein that IMR services may be distributed to other servers hosting other media channels without departing from the spirit and scope of the invention and that IMR services are not limited to voice services.

In one implementation WFM server 114 may be charged with managing pending interaction requests that have customer-driven process schedules. WFM server 114 manages workforce scheduling of live agents and may manage interaction-processing schedules for live agents working independently or in agent groupings. WFM server 114 with the aid of SW 125 may manage scheduling and notification of pending interaction requests to be processed according to specific customer schedules and may reserve live agents and to some extent automated resources for processing those requests at the specific scheduled processing times and dates.

Server 114 includes a data repository 127 that is adapted to contain data relative to the active workforce availability and current interaction processing schedules as well as other scheduled duties of live agents. WFM server 114 may interact with live agent stations 118 (1-*n*) through agent desktop (DT) applications the agents use to log-into the system and to direct their tasks including interaction processing. SW 125 may be distributed to more than one server without departing from the spirit and scope of the present invention. WFM server 114 represents one server location where scheduled processing of deferrable interactions may be enforced by the contact center system.

SW 117 running on CTI processor 111 may collect information about callers at switch 110 whom have requested scheduled processing of their interaction requests. According to one embodiment, such requests may be similar to a call back request except that the schedule associated with the request may be a firm schedule created by the customer that is not specifically influenced by the contact center. Likewise, SW 117 *b* running on router 131 may collect information about interaction requests received at the router for further processing where customers have scheduled those requests for specific processing dates and times. SW 117 *c* running on universal routing server 112 may collect information about interactions submitted for routing and may in certain instances forward data about those interactions to WFM server 114 whenever there is a processing schedule attached or a decision has been made to schedule a future processing for an interaction. It is noted herein that a decision by a customer to schedule an interaction for future processing may be made during the routing process such as when no live agent is available to handle the interaction.

It is noted herein that a scheduled interaction request can be canceled prior to a scheduled time by sending a second request that explicitly cancels the first request for processing. Likewise, the schedule time for processing the request can be updated by the customer after the requests has been sent. In one implementation the customer may specify a hard date or a defined window or range, such as not processing before time A or after time E set by the customers. The schedule data may include references to times and/or events. In one implementation, the schedule may be a choice or an option created by the system presented to the customer with other options in IMR or over a media channel.

In one implementation the customer may define one or more processing times and associated processing conditions. For example, one processing condition may be not to open or manipulate the request at all before a customer defined time of T-0, and between T-0 and T-1, answer by SMS or call my number. If between T-1 and T-2 then answer by email but do not call. If not answered by T-2 then discard the request deleting it from all records.

In one implementation that involves authorization server 113 the customer may send an email to contact center 104 from an appliance such as 107 (1). After drafting the email body, the customer may create a processing schedule governing when an agent or system may process the request. The customer may then request an access token from server 113 aided by SW 130. The access token gives permission to the center to process the request only at the scheduled time for processing set by the customer. The message may be encrypted until the processing time arrives. At the time of processing, the agent may decrypt the message with a decryption key gained upon successful presentation of the token to server 113. In this implementation the message might only be available for decryption during the scheduled time for processing. Server 113 aided by SW 130 may institute a very small time window surrounding the processing date and time within which the decryption key may be made available to the processing agent. In one implementation, the customer might tie two or more acceptable processing dates and times for processing the message. In this implementation the decryption key may be available only at the scheduled times.

If the request is not accessed before the customer-scheduled date and time, the decryption key may be permanently revoked (denial of service), rendering the request permanently non-legible. In case there is more than one optional processing date and time, the decryption key may again become available to decrypt the message at the next available processing time and date. Another option may be to cause deletion of the message from a queue or inbox if it is not processed close enough to the scheduled processing time. If an agent of contact center 104 opens the request at the appropriate time for processing, the authorization server may grant the decryption key to decrypt the message so that the agent may process it accordingly. Access to the decryption key may be achieved by presenting a token to an authorization server.

Customer control over the explicit processing schedule of an interaction request may be extended to different forms of multimedia requests or contact methods. For example a customer may access contact center services through Website 122 by pressing an interactive option for receiving a call back from the center. The customer might provide a summary or additional data explaining the intent of the customer regarding the request through a pop-up form associated with the callback request.

WFM server 114 may utilize routing services within the contact center to route interaction requests that are scheduled for processing. WFM server 114 may predict or even pre-schedule a resource like a live agent to process the interaction before the scheduled processing time associated with the interaction. It is noted herein that the processing schedule created by the customer may be tagged to the interaction request or embedded therein and it may be the only unencrypted portion of the message. Therefore, the request may be decrypted before final routing to understand the intent of the message and the type of interaction requested by the customer. The media type requested in processing of the message may differ from the media type of the message itself.

In other implementations, such as voice over Internet protocol (VoIP) or IMR-assisted voice communication, the invention may enable recorded voice data submitted by the customer as part of a request (call) or left message to include the acceptable processing schedule, where a call back must be initiated at the scheduled processing time for the event before the recorded audio can be understood by an agent or by a voice response system. In addition to text encryption and audio encryption, video may also be similarly encrypted such that the video of the caller may not be played or, if played, not deciphered by a human or optical recognition process such as face recognition. This implementation may also apply to video mail messages.

Figure 2:
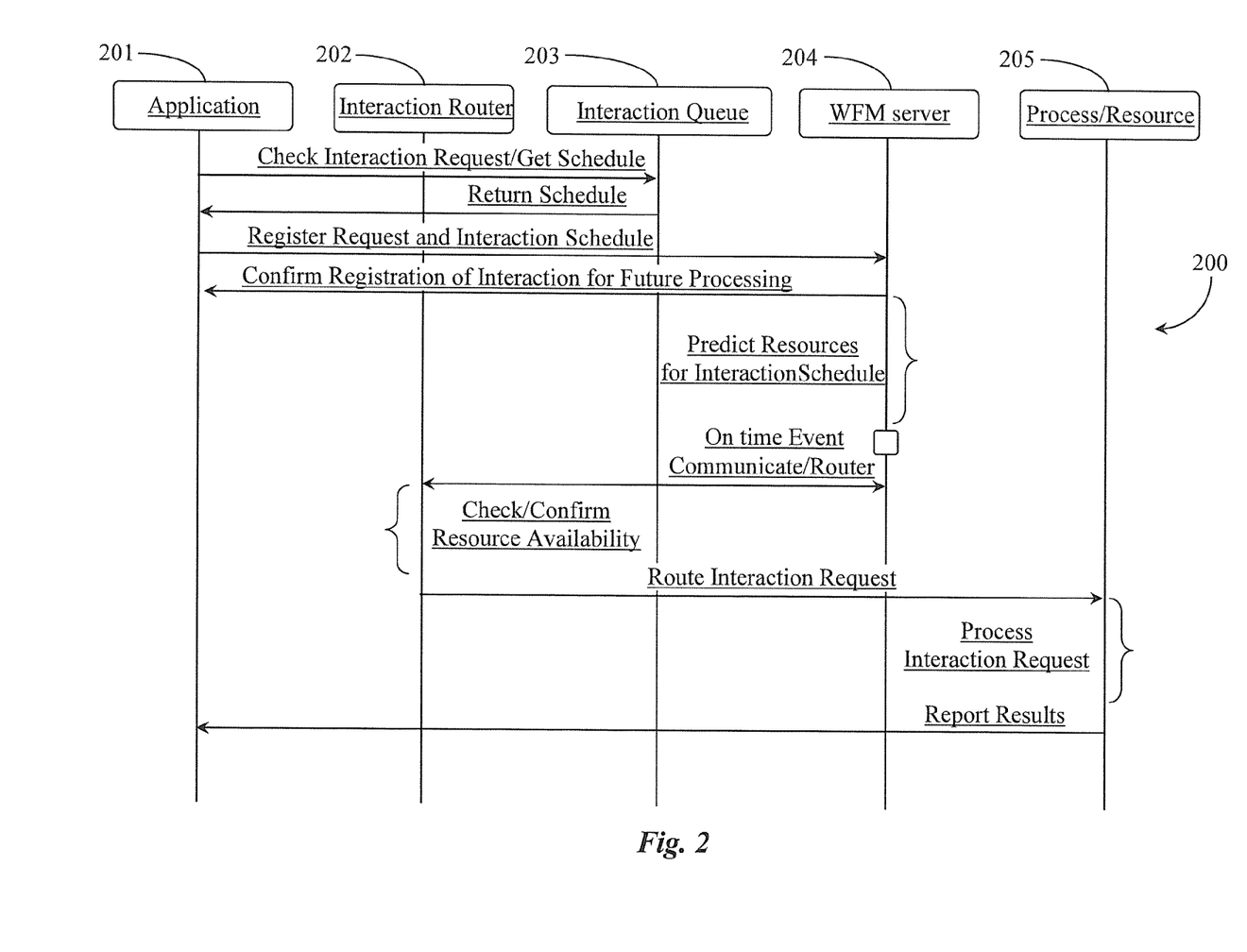
FIG. 2 is a sequence diagram depicting interaction between call center components and systems during interaction processing per customer-driven schedule.

In one implementation a customer may desire tech support from an IT department. For example, the customer may be working with a "system" on a connected appliance (access appliance) and realize that something in the setup (software configuration, or IT infrastructure) requires fixing. The customer might contact the service center desk and express his or her goals. The actual processing of the request may be scheduled at such a time when the IT staff is there and the CC system is not high-loaded FIG. 2 is a sequence diagram 200 depicting interaction between call center components and systems during interaction processing per customer-driven schedule. Diagram 200 depicts several contact center components that may interact with one another during practice of the present invention. In one implementation, an application 201 analogous to SW 117 (a-c) of FIG. 1 monitors all incoming interactions queued in an interaction queue 203. Interaction queue 203 may represent any parking place for incoming interaction requests. Incoming interaction requests that have a processing schedule are the focus of monitoring by application 201. When application 201 finds a request for interaction with a processing schedule attached, the interaction queue returns the processing schedule along with data relevant to the interaction request such as media type, location in the system (queue location, etc.), and the like. In one implementation, application 201 may reside on a WFM server enabling the server to monitor the interaction queue to detect requests that are associated with a schedule.

Application 201 may register the request and the interaction-processing schedule with a workforce management (WFM) server 204, analogous to server 114 of FIG. 1. WFM server 204 may then confirm the registration request from application 201. WFM server 204 may handle scheduling and notification services for all of the incoming interactions that are discovered to include a processing schedule. The processing schedule may be implicit such as request processing on Friday at 3:00 PM. In one implementation, the customer may include a time window in scheduling such as 15 minutes before, up to 15 minutes after, the scheduled time for the interaction processing. Interaction processing may include live interaction with the requestor and/or processing by an automated service without departing from the spirit and scope of the present invention.

In one implementation, WFM server may look ahead to a scheduled processing time for an interaction and may predict or plan for the availability of resources to handle the interaction request. WFM server 204 may reserve one or more live agents depending on the number of interaction requests received that need to be processed per schedule, and the nature of the schedule itself. For example, if there are 20 interaction requests that seek live assistance and that have similar schedules (coming due during a same time period) for processing, the server may organize the availability of a group of agents to handle those requests. The requests with scheduled processing may be mixed in with the normal incoming traffic. The scheduled requests may receive priority in the system over non-scheduled requests for interaction. In one implementation a request that is scheduled by a customer for processing may be placed in front of a queue of many non-scheduled requests if the wait time in queue would make the scheduled processing unlikely to occur.

WFM server 204 with the aid of an application such as SW 125 (FIG. 1) may apply action notification alerts to requests so that when a processing time and date arrives for a request, an alert signifying an "on-time" or "just-in-time" event fires relative to a request. The WFM server may communicate with interaction router 202 analogous to router 112 (FIG. 1) when it is time to process a request. Router 202 may check and confirm immediate resource availability for the request and may then route the interaction request to a reserved resource or to one that happens to be available at the time of interaction request processing. The interaction request may be routed to a target process or resource 205 for handling the interaction.

The process or resource may be an auto attendant service, a live agent service, or some other type of resource that might process an interaction. After processing the interaction, the interaction results may be reported back to the application and/or logged in a database for future reference. It is noted herein that there may be acts for encryption and decryption practiced in conjunction with request processing according to another implementation where the customer desires privacy and security. OAuth protocol may be used to provide token-based security, and in one implementation server 113 of FIG. 1 may be an OAuth enabled authentication server without departing from the spirit and scope of the present invention. It is also noted herein that while receiving a callback from contact center might be one option, a second call (scheduled) may be executed by the customer wherein the first call was to pre-alert the center to the scheduled interaction. This feature may be enabled and supported in an automated fashion on the customer's accessing device like a smart phone.

Figure 3:
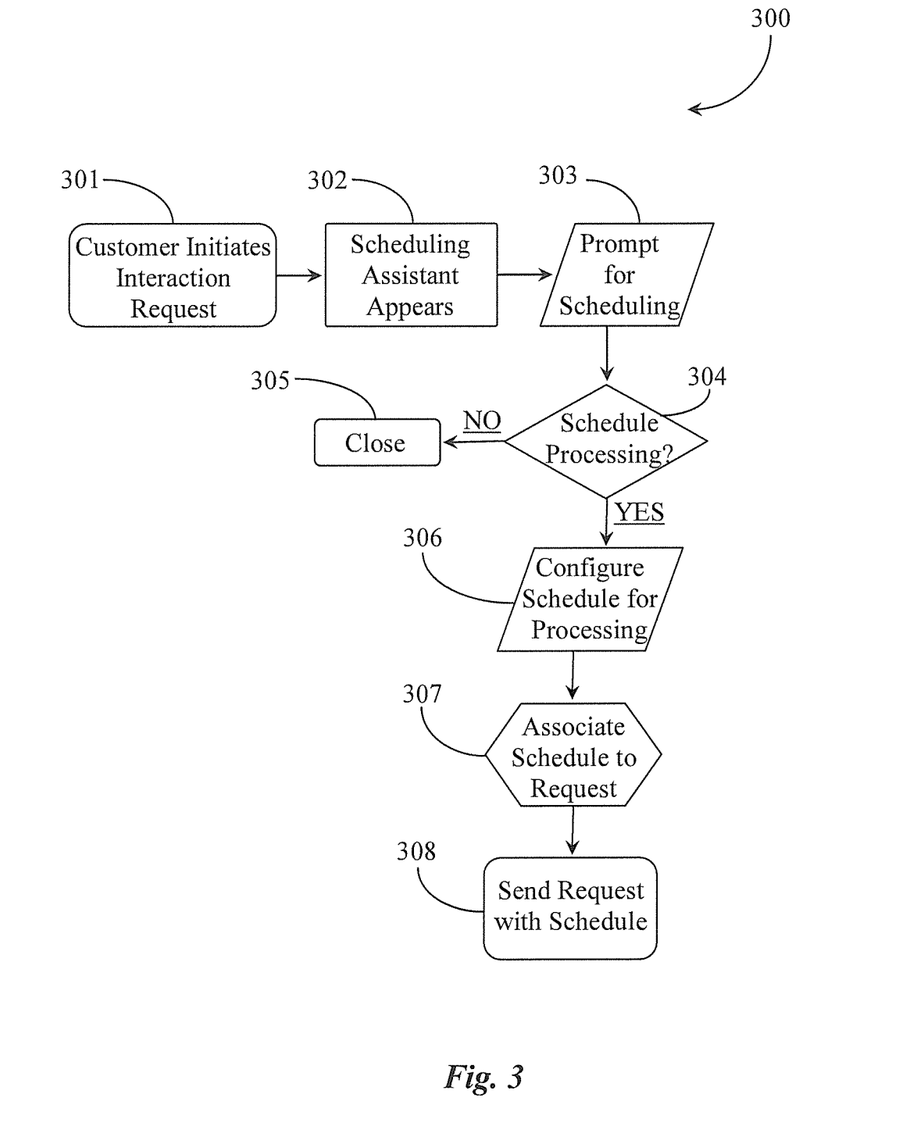
FIG. 3 is a process flow chart depicting acts for initiating and sending an interaction requests with a processing schedule.

FIG. 3 is a process flow chart 300 depicting acts for initiating and sending an interaction request with a processing schedule according to one embodiment of the invention. In this series of acts, it is assumed that the customer in act 301 has (on the sending communications appliance) a server-assisted or standalone user interface (UI) analogous to SW 126 (a-d) of FIG. 1 above. In act 301 the customer may initiate an interaction request. In one implementation, the act of initiating an interaction request by opening a communication application such as a messaging application automatically causes the UI, via program extension or API to open in act 302. In another implementation the "scheduling assistant" may be manually executed and displayed in act 302.

In act 303 the scheduling assistant may prompt the customer to schedule the request for processing by pop-up, text balloon, audio prompt, or other graphical or textual methods. In one implementation, the customer may determine whether or not to schedule a processing of the initiated request for interaction in act 304. In one implementation, certain contacts listed in the address book or contact list of the program used to initiate the request may be pre-configured using the UI to always receive requests with a specified schedule for processing. In this implementation the UI may not appear until the customer selects a recipient for the request.

If the customer decides not to impose a schedule for processing the initiated request, then the flow may proceed to act 305 and close for that request. If the customer determines to schedule the request for processing, the flow may proceed to act 306. In act 306 the customer configures a schedule for processing. A schedule may include a time and a date that the customer desires that the goal of the intent of the message be fulfilled. A response, which might result from a scheduled processing might be in another form of multimedia than the media used to send the request. A process may be any type of processing that is performed by the contact center or affiliates relative to the request content, such as initiating transactions, recording information, matching products, registering a product, witnessing a purchase, issuing a certification, and the like. In one implementation the customer may define one or more processing times and associated processing conditions. For example, one processing condition may be not to open or manipulate the request at all before a customer defined time of T-0, and between T-0 and T-1, answer by SMS or call my number. If between T-1 and T-2, then answer by email but do not call. If not answered by T-2, then discard the request deleting it from all records.

In act 307 the scheduling assistant may associate the schedule to the initiated request by electronic tagging, embedding the data in the message header, adding a data frame, or any other attachment method that is machine-readable and understood by the receiving system software. In act 308 the customer may send the request with the attached processing schedule. In this implementation, it is assumed that the request is in the form of an electronic message, which may include both text and graphics in the form of still pictures and or video with or without audio. In one implementation the interaction request of act 301 may be initiated from a Web page accessed from a Web server in the form of an instant message application protocol (IMAP) communication or a hypertext transfer protocol (HTTP) based request. In one implementation the scheduling assistant retains the schedule and alerts the customer when the scheduled time and date associated with a previously sent request approaches.

Figure 4:
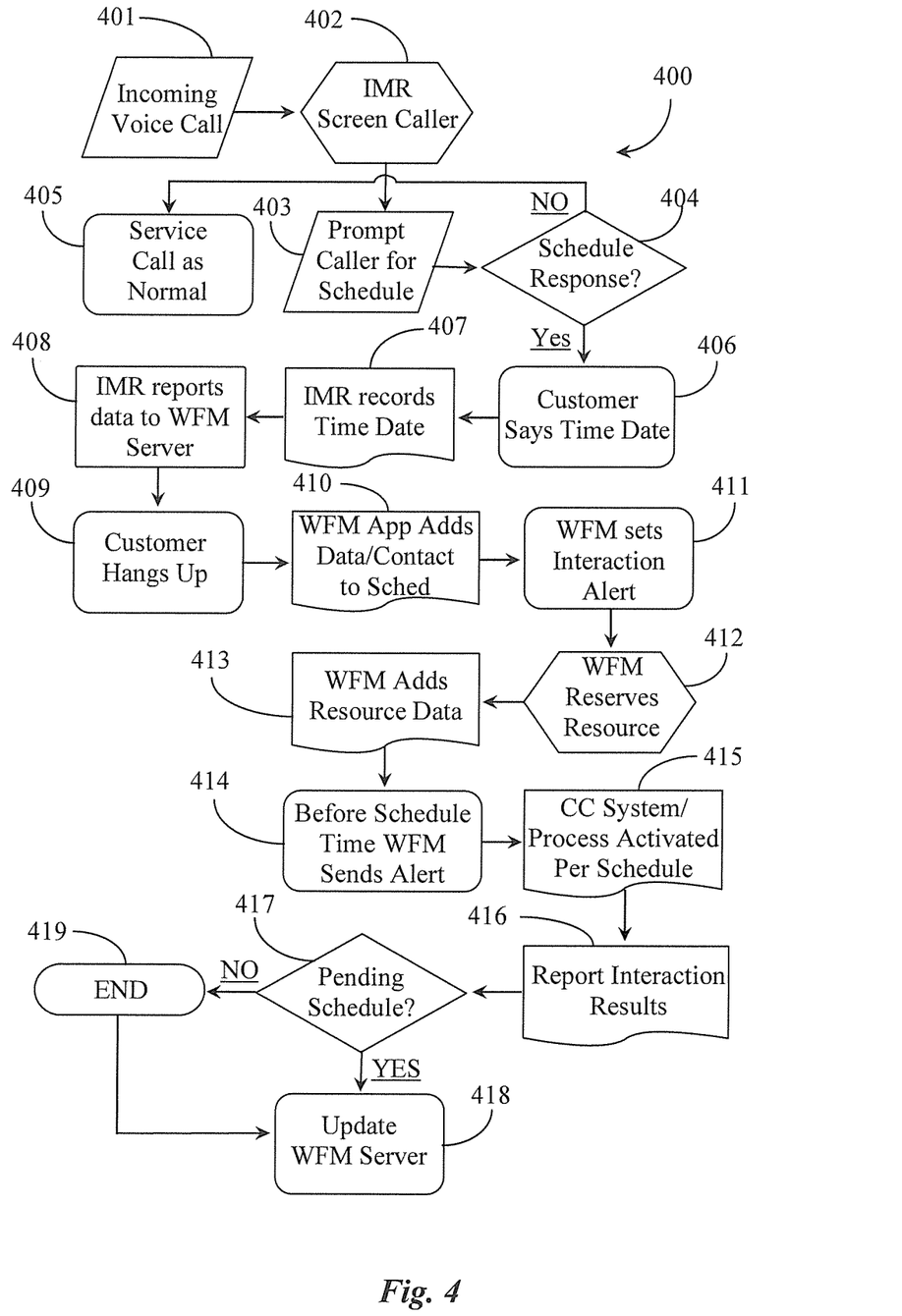
FIG. 4 is a process flow chart depicting acts for offering customer-driven process scheduling from an interactive media response (IMR) system according to an implementation of the present invention.

FIG. 4 is a process flow chart 400 depicting acts for offering customer-driven processing scheduling from an interactive media response (IMR) system according to an implementation of the present invention. In one implementation customers who call into a contact center may register a scheduled interaction request with an automated attendant, like an IMR system, which could support any media. Unlike a call-back scenario where the customer retains position in queue, the request for interaction may specify a time and date for processing the request and may iterate which media channel (for response or interaction) to use to respond.

In act 401 an incoming voice call may arrive at an IMR attended processing point dependant upon media type. In act 402 the IMR might screen the caller for intent typically by playing an audible menu that the caller may respond to. In this way the IMR system may determine the intent of the caller such as a desire for a future interaction. The agent pool handling live calls (voice scenario) may be busy at the time and estimated wait time in queue may be more than such callers wish to endure. The IMR system may interact with the caller to determine request intent (what the caller wants to happen) before prompting for treatment options in the absence of a live available agent.

The IMR system may prompt the caller in act 403 to engage in an option to configure a schedule relevant to a future interaction such as processing of the intent of the request instead of, or in addition to, providing the option to the caller for receiving a standard call back over the same media at a time that is convenient for the contact center. Act 403 may not occur at all if IMR interaction with the caller takes a path away from scheduling a processing of the request. In one implementation the flow could be from act 402 to act 405 where the call may receive a standard treatment.

In act 404 the caller (voice scenario) may determine whether or not to configure a schedule for initiating a processing of the request according to intent of the caller. If the caller determines not to opt for a scheduled processing of the request intent in act 404, the process may move to act 405 where the call may be serviced by the contact center system as a standard incoming call. In this implementation the caller may opt to remain in queue until a live agent becomes available to handle the call, or the caller may elect a call back and may terminate the call while remaining in the same virtual queue position and receiving a response when the virtual queue position advances to the point that a live agent picks up the virtual call and makes a call back using the origination number. It is noted herein that callback from the contact center may represent just one option. In another implementation, the customer may initiate a second call (at a scheduled time) whereas the first call alerts the contact center about the upcoming actual call. This option might be enabled in an automated way at the customer's end device such as a smart phone for example.

If the caller elects to configure a schedule for processing of the request intent at act 404, the flow advances to act 406 where the customer may say the time and date for processing of the request intent. In one implementation, dates and times that the contact center does not operate if any are disclosed to the caller so that the caller may configure a reasonable schedule that coincides with center operational hours. However, this is not specifically required in some implementations where the agents in the center are on call 24/7, are home agents with a flexible schedule, or are otherwise willing to conduct business during off hours.

In act 407 the IMR system records the time and date articulated by the caller. In one implementation the time and date may also be entered on a telephone keypad. In act 408 the IMR system reports the request record and schedule to a workforce management (WFM) server having access to agent scheduling and system capacity data. In this act the IMR system may confirm to the customer that the request scheduling was successfully entered into the system. The caller may hang up terminating the call in act 409. In act 410 the WFM application extension may add the request record including the contact information and scheduling data to a calendar that may be integrated with the workforce management calendar.

In one implementation the request record is translated from audio data to text. In this implementation the request record including request intent and customer information within it may be encrypted until such time that the schedule arrives for processing. In one implementation the WFM server may retain enough knowledge of the request intent to be able to predict or plan for the availability of an agent that is qualified to handle the request or the availability of a process that is relevant to the request intent. In one implementation, request intent remains unencrypted while the caller data may be encrypted until the scheduled date for processing the request arrives.

In act 411 the WFM application may set an interaction alert relative to one or more scheduled times and dates the caller may have submitted in the schedule. It is noted herein that for some implementations where a process or transaction is a multi-step process or cannot be accomplished in a single interaction, the caller may schedule the multipart process part by part, adding more than one time and date, each time and date relevant to an individual part of a larger process. The interaction alert simply notifies the server when a time and date for a scheduled processing of a request is about to occur so that the server may take action to alert other relevant services such as routing and the like.

In act 412 the WFM server may reserve or "book" a resource for responding and/or processing the request. In act 413 the WFM server may add the data about the resource booked at act 412 to the schedule information. Acts 412 and 413 are optional acts and are not specifically required in order to practice the present flow according to one embodiment of the invention. Just before a scheduled time and date for processing of an interaction request, the server having received an alert of the pending event may send an alert of the pending event to the appropriate contact center system(s) in act 414. For example, if the intent of a registered request for interaction requires interaction with a live agent, the WFM server may alert the agent level routing service or system so the event may be routed to an appropriate agent reserved or otherwise determined adequate and available to handle the interaction.

In act 415 the contact center (CC) system or process is activated according to the schedule associated to the request. In one implementation the request for interaction specifies a call back from a live agent and the scheduled date and time is observed during placement of an outbound call to the customer. Such a call may take priority over other outbound calls in an ongoing outbound calling campaign because of prior expressed interest made by the original caller whom requested a scheduled of the intent of the request. After the interaction occurs, the CC system may report the results of any interaction or processing in act 416. Results of the interaction may include product data, transaction data, payment data, shipping information, statistics related to the interaction such as handling time, agent performance level, and so on.

The CC system may make a determination as to whether there are any more scheduled dates and times associated with the original schedule configured at act 406 in act 417. In act 417 if there are no pending times and dates other than the first processing date, the flow may move to act 419 where the process may end for that caller. The flow may then proceed to act 418 where the server may be updated to expunge the original reference to the interaction request. If there is another date and time for another future processing event relative to the request partly processed, then the flow may move to act 418 where the WFM server may be updated (calendar) to reflect further scheduled dates and times while the expired time and date associated with the request for interaction may be deleted. In one implementation at the tail end of the scheduled interaction may include an option expressed to the caller to schedule additional processing dates and times for scheduled further processing of a new or revived request.

In one implementation of the invention the process depicted herein is applicable to a VoIP CC system that uses a "soft switch" and a Web-based version of IMR in place of the previously mentioned components. In voice implementation it is very likely that the caller hangs up and then receives some type of media response or a notification of the processing of the intent of the request. It is also noted herein that the customer may have complete control of when an interaction should be answered or otherwise processed.

Figure 5:
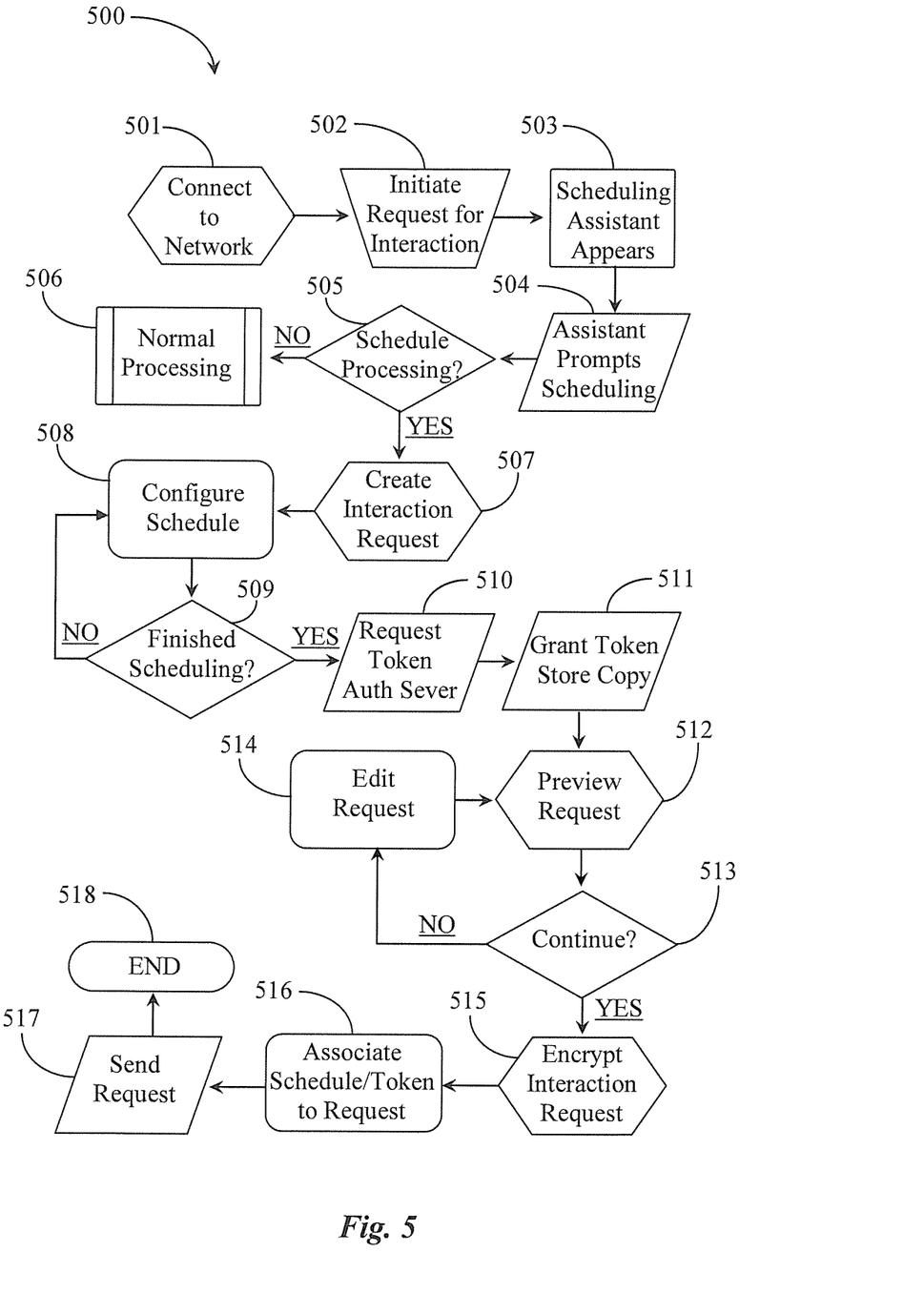
FIG. 5 is a process flow chart depicting acts for leveraging token-based security for processing scheduled interaction requests according to an implementation of the present invention.

FIG. 5 is a process flow chart 500 depicting acts for leveraging token-based security for processing scheduled interaction requests according to an implementation of the present invention. In act 501 a customer takes action to connect to the network. In act 502 the customer decides to initiate a request for interaction. In act 503 the scheduling assistant appears as was mentioned in the description further above for FIG. 4. In act 504 the scheduling assistant prompts the customer to add a schedule for initiating interaction processing. In act 505 the customer determines whether or not to add schedule data to the request initiated in act 502.

If the customer determines not to schedule a future interaction or process with the request, the flow may move to act 506 where normal CC processing scenarios may occur.

If the customer determines to add a schedule to the request in act 505, the flow may proceed to act 507 where the customer may draft the message for send. At act 508 the customer may configure a scheduled process. In this implementation the message draft is prepared before a customer schedules processing to treat the request intent. In act 509 the customer may determine if scheduling is satisfactorily finished. If scheduling is not finished in act 509 the flow may move back to act 508 for further configuration of the schedule to accompany the request.

If scheduling is finished to the satisfaction of the customer in act 509 the flow may proceed to act 510 where the message originator may request a token from an authentication (Auth) server analogous to server 113 of FIG. 1. The recipient of the message may use a decryption key to access the request data. In act 511 the authentication server grants the request, issues a token, and stores a copy of the token in a secure data storage device. In act 512 the customer may be prompted to preview the request for errors for edit-worthy text or graphics.

In act 513 the customer determines whether or not to continue the process without edits made to the message. If the customer determines in act 513 not to continue on with the current processing, then the flow may move to act 514 where the customer may edit the message using tools available through the user interface. The process may loop back to act 512 for request preview after the customer performs one or more edits. In act 513 if the customer determines to continue with the process, the flow may move to act 515 where at least a portion of the generated request may be encrypted. In act 516 the scheduling assistant (UI) may associate the schedule and the token to the message request. The customer may send the scheduled message to the designated recipient in act 517. The process may then end for that caller in act 518.

In one implementation the CC recipient may present the token for authentication ahead of the schedule date during a very short period. The time period added ahead of the schedule time may be relatively small. The time period might be applied to the schedule to define an acceptable window within which the recipient (human or machine) may begin processing the request (pre-interaction tasks) just before the scheduled time to process. This may be referred to as just-in-time processing where several tasks including message decryption may occur just before the schedule time arrives for processing. The allotted time may be as little as a few seconds to as much as a few minutes. In another implementation the exact time and date for processing of the request must arrive before the WFM server alerts an appropriate CC component to begin processing the request.

It is noted herein that scheduling may be strictly enforced with user of a security token that is only available when the processing date occurs. In one implementation, scheduling may be initiated in an IMR session. In one implementation a plug-in or downloadable application might be provided to customer devices that include endpoint-based logic for automatically scheduling a request for processing at the call center. In one implementation there may be multiple processing times and media designations for response set by the customer. In such implementations there may be more than one security token, each token configured for accessing a portion of the request relative to an appropriate processing time and media designation.

It will be apparent to one with skill in the art that the customer-driven scheduling system of the invention may be provided using some or all of the mentioned features and components without departing from the spirit and scope of the present invention. It will also be apparent to the skilled artisan that the implementations described above are specific implementations of a single broader invention that may have greater scope than any of the singular descriptions taught. There may be many alterations made in the descriptions without departing from the spirit and scope of the present invention.

What is claimed is:

1. An apparatus comprising:
   a processor; and
   a memory storing program instructions thereon that, when executed by the processor, cause the processor to:
   receive, from a communications appliance accessible to an end customer, a request for a deferrable interaction, and schedule data corresponding to the request for the deferrable interaction, wherein the schedule data comprises a plurality of processing times, each of the processing times having a corresponding processing condition;
   store information corresponding to the request for the deferrable interaction in the memory;
   monitor criteria of the schedule data for determining when the request for the deferrable interaction is to be processed for routing;
   in response to detecting the criteria being satisfied, retrieve the stored information from the memory; and
   transmit a command for routing the deferrable interaction to a contact center resource based on the stored information.

2. The apparatus of claim 1, wherein the request for the deferrable interaction is a voice request in a plain old telephony service (POTS) format or a voice over Internet protocol (VoIP) format.

3. The apparatus of claim 1, wherein the request for the deferrable interaction is an email, a short message service (SMS), or a multimedia message service (MMS) request.

4. The apparatus of claim 1, wherein the request for the deferrable interaction is a video mail, a video call, or a Web request supported by an applicable Internet protocol.

5. The apparatus of claim 1, wherein the plurality of processing times comprise a first point in time before which the request for the deferrable interaction should not be processed.

6. The apparatus of claim 5, wherein the plurality of processing times comprise a second point in time and a third point in time, between which a response to the request for the deferrable interaction should be in the form of a first media type.

7. The apparatus of claim 6, wherein the plurality of processing times comprise a fourth point in time after which the response to the request for the deferrable interaction should be in the form of a second media type.

8. The apparatus of claim 1, wherein the instructions further cause the processor to transmit, to the communications appliance, an executable interface for defining the schedule data for processing the request for the deferrable interaction.

9. A method comprising:
   receiving, by a processor, from a communications appliance accessible to an end customer, a request for a deferrable interaction, and schedule data corresponding to the request for the deferrable interaction, wherein the schedule data comprises a plurality of processing times, each of the processing times having a corresponding processing condition;

storing, by the processor, information corresponding to the request for the deferrable interaction in a memory;

monitoring, by the processor, criteria of the schedule data for determining when the request for the deferrable interaction is to be processed for routing;

in response to detecting the criteria being satisfied, retrieving, by the processor, the stored information from the memory; and transmitting, by the processor, a command for routing the deferrable interaction to a contact center resource based on the stored information.

10. The method of claim 9, wherein the request for the deferrable interaction is a voice request in a plain old telephony service (POTS) format or a voice over Internet protocol (VoIP) format.

11. The method of claim 9, wherein the request for the deferrable interaction is an email, a short message service (SMS), or a multimedia message service (MMS) request.

12. The method of claim 9, wherein the request for the deferrable interaction is a video mail, a video call, or a Web request supported by an applicable Internet protocol.

13. The method of claim 9, wherein the plurality of processing times comprise a first point in time before which the request for the deferrable interaction should not be processed.

14. The method of claim 13, wherein the plurality of processing times comprise a second point in time and a third point in time, between which a response to the request for the deferrable interaction should be in the form of a first media type.

15. The method of claim 14, wherein the plurality of processing times comprise a fourth point in time after which the response to the request for the deferrable interaction should be in the form of a second media type.

16. The method of claim 9, further comprising transmitting, to the communications appliance, an executable interface for defining the schedule data for processing the request for the deferrable interaction.

17. The apparatus of claim 1, wherein the instructions further cause the processor to establish a connection between the contact center resource and the communications appliance in response to the command.

18. The method of claim 10, further comprising establishing, by the processor, a connection between the contact center resource and the communications appliance in response to the command.

19. The apparatus of claim 1, wherein the processing condition corresponding to a processing time from among the plurality of processing times comprises not manipulating the request for the deferrable interaction before the processing time.

20. The apparatus of claim 1, wherein the processing condition corresponding to a first processing time from among the plurality of processing times comprises communicating by way of a first communication medium and the processing condition corresponding to a second processing time from among the plurality of processing times comprises communicating by way of a second communication medium different from the first communication medium.

21. The method of claim 9, wherein the processing condition corresponding to a processing time from among the plurality of processing times comprises not manipulating the request for the deferrable interaction before the processing time.

22. The method of claim 9, wherein the processing condition corresponding to a first processing time from among the plurality of processing times comprises communicating by way of a first communication medium and the processing condition corresponding to a second processing time from among the plurality of processing times comprises communicating by way of a second communication medium different from the first communication medium.

* * * * *